March 7, 1939.  J. H. MILLAR  2,149,306
MANUFACTURE OF FOOD EXTRACT FROM YEAST
Filed June 6, 1935  3 Sheets-Sheet 1

James Hill Millar
INVENTOR
his ATTY.

March 7, 1939.  J. H. MILLAR  2,149,306
MANUFACTURE OF FOOD EXTRACT FROM YEAST
Filed June 6, 1935  3 Sheets-Sheet 2

James Hill Millar
INVENTOR

By Otto Munk
his ATTY.

March 7, 1939.   J. H. MILLAR   2,149,306
MANUFACTURE OF FOOD EXTRACT FROM YEAST
Filed June 6, 1935   3 Sheets-Sheet 3
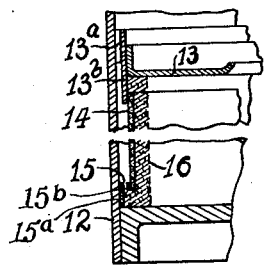
Fig. 3.ª
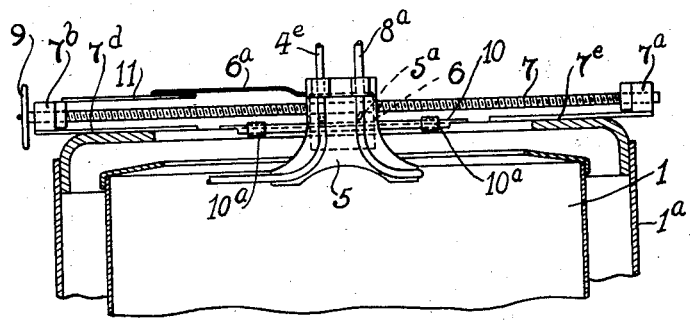
Fig. 5.
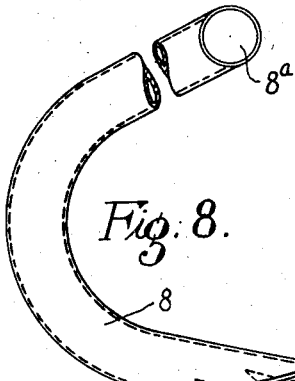
Fig. 6.
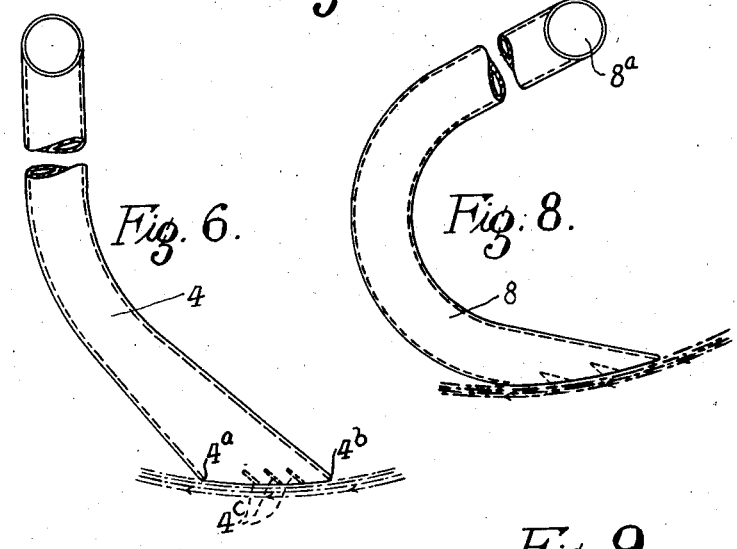
Fig. 8.
Fig. 9.
Fig. 7.
James Hill Millar
INVENTOR
By [signature]
his ATTY.

Patented Mar. 7, 1939

2,149,306

UNITED STATES PATENT OFFICE 2,149,306

MANUFACTURE OF FOOD EXTRACT FROM YEAST

James Hill Millar, Dublin, Irish Free State, assignor to Arthur Guinness, Son and Company Limited, London, England Application June 6, 1935, Serial No. 25,216
In Irish Free State June 22, 1934

7 Claims. (Cl. 99—97)

This invention relates to an improved method of manufacturing a soluble food extract from brewers' yeast and particularly from a yeast which is rich in hop extract.

I know that several processes have been proposed for the debittering of crude yeast extract produced by the peptonization of yeast, some involving prolonged treatment by boiling and filtration and others the use of ordinary wood charcoal or ordinary animal charcoal. Further, I am aware that it has been proposed to effect the debittering of crude yeast extract without a prior chemical debittering treatment, by the addition of colloid adsorbing agents, such as, for example, activated carbon. Whilst activated carbons exert their powers with great speed and completeness, very special difficulties arise when their separation from yeast extract is attempted. The bulk of the added carbon can be removed by any appropriate means, but a fraction remains as a dispersed colloid on the protein material of the yeast extract.

The object of this invention is to provide a novel process, whereby even the finest grades of activated carbon can be added to yeast extract and subsequently removed or almost entirely removed and any small residue enclosed by coagulation of protein matter. The product can then be truly claimed as a pure yeast extract containing only constituents derived from brewers' yeast, not requiring added flavours from other sources and marketable as a food.

In the production of a food extract from brewers' yeast outstanding difficulties were found as follows:—

1. To secure a reasonably sharp separation of the required yeast extract from the large amount of colloidal and insoluble matter consisting of residues of the yeast cells.

2. To secure rapid filtration of the crude extract from (1) in order to give a bright extract because failure to obtain brightness acts disadvantageously and renders the separation of colloidal carbon more difficult.

3. To secure rapid filtration of the extract after it has been treated with activated carbon and separated, but still retaining a distinct amount of carbon in colloidal dispersion.

My invention may comprise a new or improved process of treating extract of yeast, produced by self-peptonization, characterized by the liquefied and digested yeast being diluted, separated in a plain centrifuge, filtered and separated in a novel form of centrifugal filter and separator, concentrated in vacuo to remove some objectionable flavours and to precipitate undesirable solids, again filtered and separated in a centrifuge and, at a suitable temperature, treated with a colloid adsorbing agent or agents, such as activated carbon, to remove bitter and other undesirable flavours. The resulting extract is centrifuged to remove the suspended portion of the carbon and then filtered in the centrifuge to remove the residue of colloidally dispersed carbon. After evaporation in vacuo to a thick paste further to precipitate unwanted solids, the extract is redissolved in hot water to destroy proteolytic enzymes. Subsequently the extract is centrifuged in a plain centrifuge from which the clear extract is finally evaporated, preferably in a forced circulation evaporator, to a thick paste which is the final product. Filtration at different stages of the process is effected by means of a filter pulp with an adsorptive constituent and, preferably, composed of cellulose and asbestos in suitable proportions to suit the stage of and nature of filtration desired. The filter pulp is centrifugally applied to a gauze apron or equivalent support in the centrifuge, carried therein in such manner as to separate the location of the filter from the location of a collector for the filtered and separated liquid and so constructed and arranged as to avoid uneven flow of, or short-circuiting of, the liquid through the filter pulp. This collector, which is adapted for collecting the separated clear liquid extract, without splashing or frothing, comprises a hollow flat blade or "knife" having its collecting edge parallel with the spinning liquid, and adjustably submerged in the liquid to exclude air, collection of the liquid into the collector being obtained by means of internal divisions or vanes set at the best angle say 45° to deflect the flow of liquid into the ports thus formed in the collector and, at the same time, avoiding any appreciable disturbance of the sediment in the bowl. The insoluble sediment is removed from the centrifuge by another collector preferably of the same or similar type but with larger ports.

The product prepared or produced by the process hereinbefore described forms a new article of manufacture providing a palatable and soluble extract containing only constituents derived from brewers' yeast and not requiring added flavours from other sources.

The accompanying drawings show, by way of example, means comprising filtering and separating apparatus for carrying out the process in accordance with this invention.

Fig. 3a is an enlarged sectional view of a portion of the filtering and separating centrifuge illustrated at Fig. 3.

Fig. 5 is a cross sectional elevation on the line Y—Y Fig. 2 and looking in the direction of the arrow.

Figs. 6 and 7 are respectively enlarged plan and end views of the collector blade for collecting filtered liquid from the centrifuge.

Figs. 8 and 9 are respectively plan and end views of the collector blade for collecting sludge from the centrifuge shown in Fig. 1.

Figure 1:
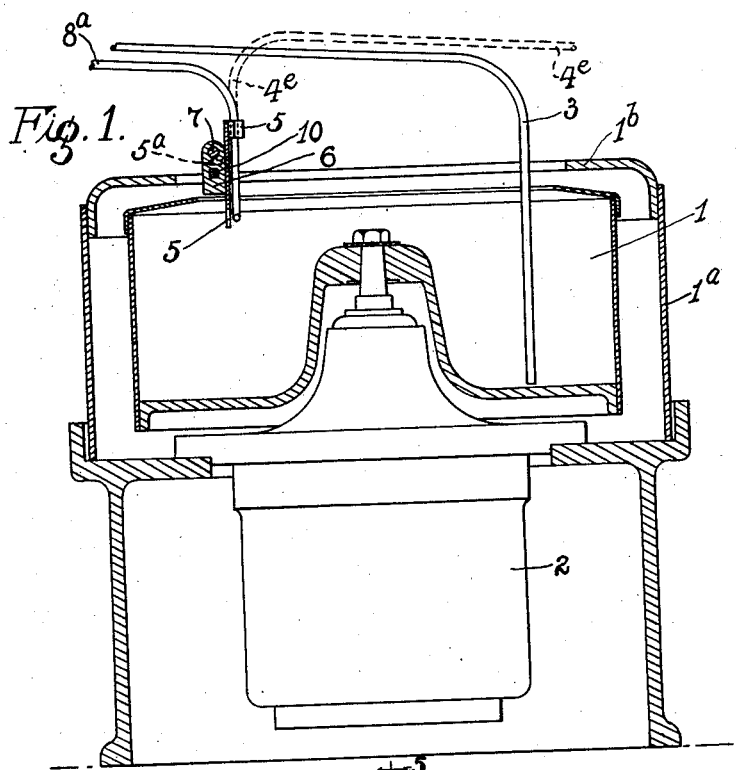
Fig. 1 is a part sectional elevation of a centrifuge for separating the extract from the insoluble matter in accordance with the invention.

Referring to the drawings, the centrifuge shown at Fig. 1 is of known construction but has embodied therein the special forms of collecting devices and their operating screw control gear as hereinafter described. The crude pressed yeast is first liquefied by agitation in a suitable mixing machine (not shown) and at a suitable temperature, for example, 65° C., with the addition of a small quantity of common salt. The yeast is then digested in a suitable digesting vessel (not shown), for a lengthy period, (say 72 hours) at or about the same temperature, preferably a temperature of 65° C. is adopted as being the best for flavour. The resultant semi-fluid mass is diluted to a specific gravity of about 1030 (water 1000) in order to bring about a sufficient fluidity and difference of density between its liquid and insoluble portions to permit of their subsequent separation in the centrifuge shown in Fig. 1. This centrifuge comprises a bowl 1 rotatably mounted within a casing 1a and adapted to be driven by a motor arranged within a casing 2. The liquefied, digested and diluted yeast is fed from the digesting vessel into the centrifuge bowl 1 through pipe 3. For the collection of the filtered liquid from the continuously running centrifuge and for the removal of the insoluble matter which collects as a dense pasty sediment on the sides of the centrifuge bowl 1 and, further, to overcome the exceptional difficulties which arise in collecting clear liquids from yeast extracts owing to their extremely frothy nature, I employ a form of collector which is adapted to give sharp separation of extract and insoluble matter and also adapted to overcome the difficulty of frothing. This collector comprises a hollow flat blade 4 with sharpened leading and trailing edges 4a and 4b respectively adapted to reduce splashing to a minimum. The collecting edge is submerged in the extract while collecting, thus preventing the inclusion of air and formation of froth. The interior of the collecting blade 4 has a series of division members or vanes 4c leading inwardly from ports 4d on its collecting edge and arranged at an angle so as to collect the liquid with the least possible disturbance of the sediment in the centrifuge bowl. The collector blade 4 is formed in one with a pipe 4e which is secured to a bracket 5, said bracket being removably carried by a member 6 having holes therein adapted to receive pins 5a projecting from the bracket 5 (see Fig. 5). For removing the insoluble sediment from the centrifuge another collector 8 is provided and is also carried by the bracket 5, the blade of this collector is illustrated at Figs. 8 and 9 and is similar to the collector blades for the clear liquid except that the ports in its collecting edge are larger than the ports in the collecting edge of the collector for the clear liquid. This collector 8 is formed in one with a pipe 8a leading the sludge or sediment from the centrifuge. The collectors are kept submerged during collection by screw control gear consisting of the screw 7 the bracket carrying member 6 which engages the screw and an operating wheel 9. The screw 7 is mounted in bearings 7a and 7b carried by brackets 7c and 7d secured to the top inwardly projecting flange 1b of the centrifuge casing. By this arrangement the bracket carrying member 6 can be moved to keep the leading edge of the collector submerged in the liquid to take only clear or filtered liquid, also to prevent the inclusion of air and the formation of froth. Below the screw 7 is a rod 10 which is secured to the top inwardly projecting flange 1b of the centrifuge and carries stops 10a (see Fig. 5) to limit the outward movement of the collectors and the bracket carrying member 6 has secured thereto an indicating member 6a adapted to move over a graduated scale 11 for indicating the position of the collector, and for its accurate adjustment into the liquid whereby only clear or filtered liquid may pass into the collector. Turning the screw 7 in one direction brings the clear liquid collector 4 into collecting position and at the same time takes the sludge collecting device 8 out of action and vice-versa.

Figure 2:
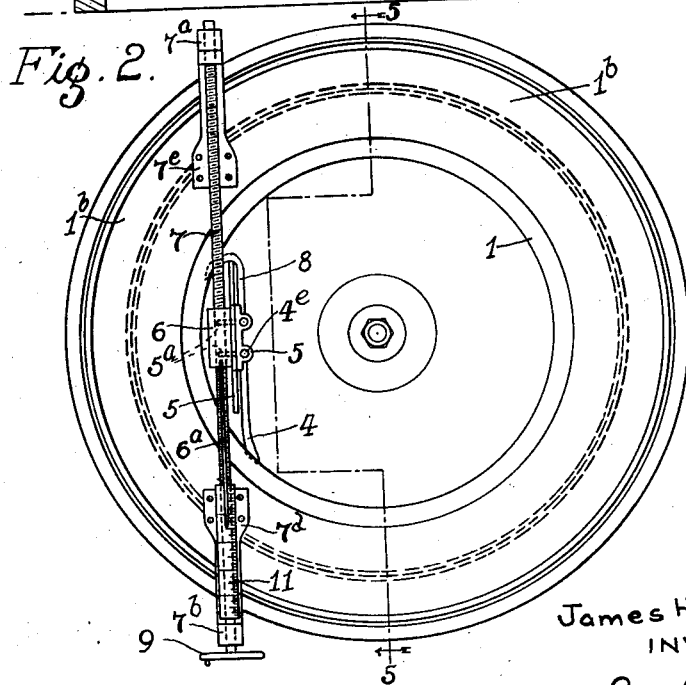
Fig. 2 is a plan view corresponding to Fig. 1.
Figure 3:
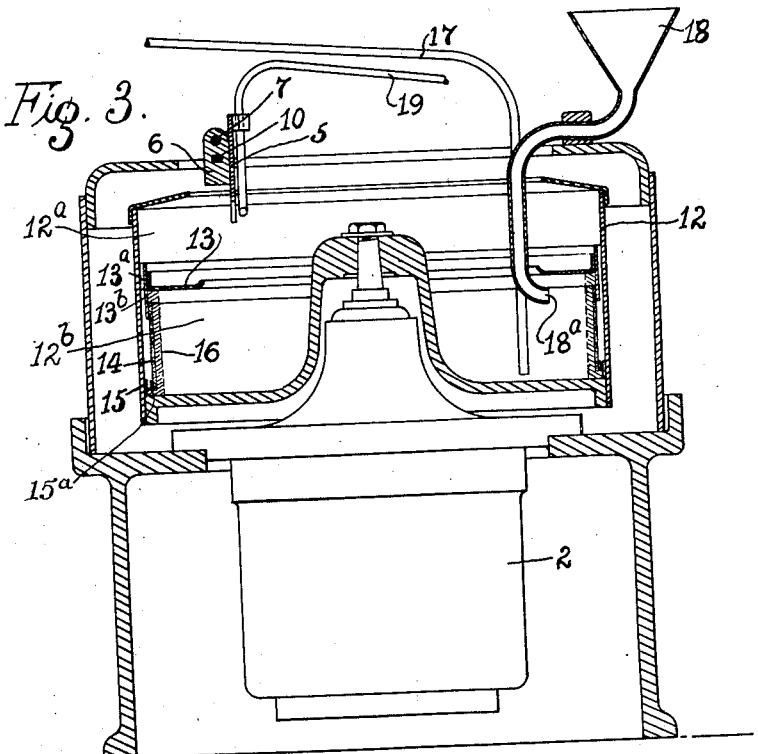
Fig. 3 is a part sectional elevation of a filtering and separating centrifuge in accordance with the invention.
Figure 4:
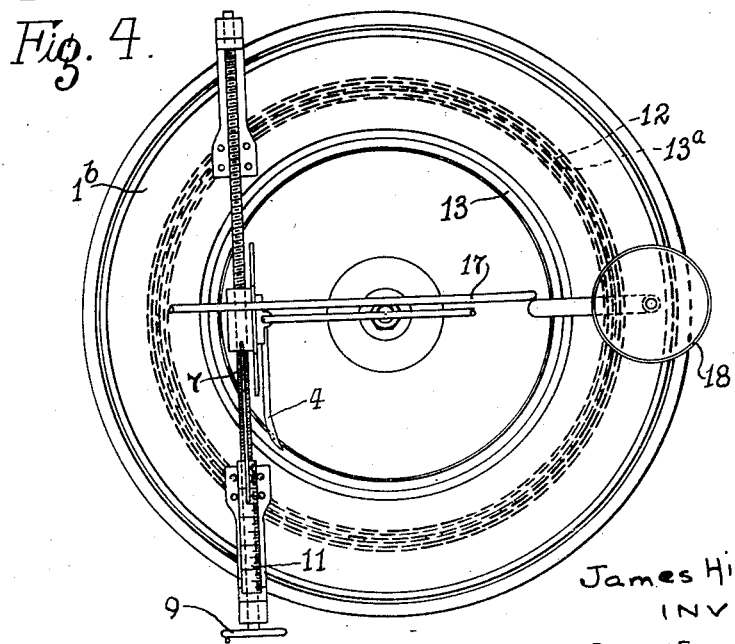
Fig. 4 is a plan view corresponding to Fig. 3.

The crude liquid extract from the centrifuge shown in Figs. 1 and 2 passed from pipe 4e to the pipe 17 is still muddy in appearance from the presence of yeast suspended matter and requires refiltration to make it bright, (otherwise the removal of activated carbon at a subsequent stage being more difficult) such filtration being carried out by leading the separated liquid from pipe 17 into the novel form of centrifuge-filter shown at Figs. 3 and 4 and which is characterized by a centrifuge bowl 12 which is divided into two chambers or compartments, a charging chamber 12b and a discharging chamber 12a by means of a horizontal diaphragm or inwardly projecting ring or plate 13 having clearance gaps, obtained by means of distance pieces 13a between its outer edge and the inner surface of the bowl 12. A gauze apron 14 is provided below the said diaphragm or plate 13, with a gap 15 between it and the inner surface of the bowl, which gap may be considered as part of the discharging chamber 12a the upper edge of the apron 14 being attached to and carried by a depending ring 13b on the outer edge of the diaphragm or plate 13, which ring 13b extends downwards a predetermined distance (approximately as shown) below the under side of the before mentioned diaphragm or plate 13. The required filter material 16, fed with a suitable carrier liquid, into the lower portion 12b of the bowl 12 through a hopper 18 and pipe 18a, is applied to the gauze apron 14 by centrifugal action and extends from the underside of the plate 13 to the gap between the bottom of the gauze 14 and ring or the like 15a so that the extract has no alternative but to pass through the filter and short circuiting and uneven flow are prevented and effective filtration is ensured. Preferably the filtering material employed consists of a layer of pulp with a special adsorptive constituent, for example, a pulp comprising asbestos 10%—cellulose 90%. By varying the speed of the centrifuge and the proportions of the filter pulp 16, it is possible to obtain the required filtration of liquids or semi-liquid materials differing in character. Smooth action of the filter medium can be obtained by selecting the correct speed which gives the correct centrifugal pressure. Too high a speed of rotation will tend to block the filter medium at or near its surface, whereas the right speed conditions are such that the adsorptive power of the medium operates throughout the greater part of the filter mass. On the contrary a loose filter medium allows too high a speed of passage of the liquid, and imperfect separation of the dispersed colloid takes place. When the clear or filtered liquid, passed through the filter 16, reaches the back of the gauze apron 14 it has a free passage behind same and upwards past the diaphragm or flange 13 to the upper portion 12ª of the centrifuge bowl 12 where clear liquid can be continuously collected by a collector 4 (having the characteristics previously described) and led through the pipe 19 to the next step in the process, being run into a forced circulation evaporator of suitable type (not shown) where it is concentrated to a specific gravity of 1070. For steady and uninterrupted flow of the extract, the speed of the centrifuge is kept within a fixed limit which may be 208 times g. as a standard.

After filtration and concentration, as described, the temperature of the filtered liquid is brought to or about 70° C. and maintained for a suitable period, for example an hour, during a portion of which period activated carbon is gradually added up to .75% to 1% volume whilst the liquid is stirred vigorously. The activated carbon removes not only bitter flavours due to the hops, but also other undesirable flavours. The bulk of the carbon in the extract, resulting from the last mentioned part of the process, that is, the suspended portion of the carbon is removed by plain or ordinary centrifuging in a centrifuge as shown in Figs. 1 and 2, and the liquid extract, now black with the remaining carbon which is colloidally dispersed is filtered bright through the centrifuge filter (Figs. 3 and 4) hereinbefore described but speeded up to 270 g. with a filtering medium consisting of, say, a two inch layer of filtering pulp preferably consisting of 60% to 80% cellulose and 40% to 20% asbestos applied and used, as already described, to remove the fine colloidally dispersed carbon not otherwise removable by ordinary methods of filtration or by plain or ordinary centrifuging.

After evaporation in vacuo to a thick paste further to precipitate unwanted solids, and to drive off the acetic acid, with consequent precipitation of insoluble phosphates, the paste thus obtained is redissolved in hot water and heated up to, or about, 97.8° C. to destroy proteolytic enzymes and complete the separation of insoluble phosphates whilst, at the same time, producing a certain amount of coagulation of protein matter which encloses the last traces of colloidal carbon not removed by filtration or with the insoluble phosphates. Thereafter the heated liquid is again centrifuged with plain centrifuging in a centrifuge as shown in Figs. 1 and 2 and the clear extract evaporated in a forced circulation evaporator of suitable type (not shown) to obtain the pure yeast extract which is the final product of manufacture.

What I claim is:

1. In a process of manufacturing a soluble food extract from brewers' yeast, which includes separating and filtering liquefied and digested yeast extract, produced by peptonisation of the yeast and adding activated carbon to remove bitter and other undesirable flavours; subjecting the extract to plain or ordinary centrifuging to remove the suspended carbon, then subjecting the extract to filtration through an adsorptive filter to remove the remaining carbon which is colloidally dispersed, evaporating the extract to a thick paste, redissolving same and heating to a temperature high enough to destroy proteolytic enzymes and produce coagulation of protein matter to enclose or remove the last trace of carbon.

2. The process of manufacturing a soluble food extract from brewers' yeast which comprises liquefying the crude yeast at about 65° C. with the addition of a small quantity of common salt, digesting the liquid for about 72 hours at said temperature, diluting the mass, and centrifuging to remove insoluble matter, further subjecting the extract to centrifugal filtration, concentrating the extract by evaporation, heating same to about 70° C. and maintaining at said temperature for about an hour while about 0.75% to 1% by volume of activated carbon is gradually added, subjecting the extract to plain or ordinary centrifuging to remove the suspended carbon and then to centrifugal filtration through an adsorptive filter to remove the colloidally dispersed carbon, evaporating the extract in vacuo to a thick paste, redissolving the paste in hot water and heating to about 97.8° C. to destroy proteolytic enzymes and produce coagulation of protein matter to enclose or remove the last trace of carbon and subjecting the heated liquid to centrifuging and evaporating to obtain the final product.

3. The process of manufacturing a soluble food extract from brewers' yeast which comprises liquefying the crude yeast at about 65° C. with the addition of a small quantity of common salt, digesting the liquid for about 72 hours at said temperature, diluting the mass, and centrifuging to remove insoluble matter, further subjecting the extract to centrifugal filtration through a filter pulp of cellulose and asbestos, concentrating the extract by evaporation, heating same to about 70° C. and maintaining at said temperature for about an hour while about 0.75% to 1% by volume of activated carbon is gradually added, subjecting the extract to ordinary centrifuging to remove the suspended carbon which represents the major part of the carbon added and then to centrifugal filtration through a filter pulp of cellulose and asbestos to remove the remaining colloidally dispersed carbon, evaporating the extract in vacuo to a thick paste, redissolving the paste in hot water and heating to about 97.8° C. to destroy proteolytic enzymes and produce coagulation of protein matter to enclose or remove the last trace of carbon, subjecting the heated liquid to centrifuging and evaporating to obtain the final product.

4. In a process of manufacturing a soluble food extract from brewers' yeast, which includes separating and filtering liquefied and digested yeast extract, produced by peptonisation of the yeast and adding activated carbon to remove bitter and other undesirable flavours; subjecting the extract to ordinary centrifuging to remove the suspended carbon, then to centrifugal filtration through a filter pulp of cellulose and asbestos to remove the residual colloidally dispersed carbon, evaporating the extract to a thick paste, redissolving same and heating to about 97.8° C. to destroy proteolytic enzymes and produce coagulation of protein matter to enclose or remove the last trace of carbon.

5. In the process of manufacturing a soluble food extract from brewers' yeast wherein liquefied and digested yeast extract, produced by peptonisation of the yeast, has activated carbon added to remove bitter and undesirable flavours; separating and filtering the extract before the addition of said carbon, and after the addition thereof, subjecting the extract to ordinary or plain centrifuging to remove the suspended carbon and then to centrifugal adsorptive filtration to remove the residual colloidally dispersed carbon, evaporating the extract to a thick paste, redissolving same and heating to about 97.8° C. to destroy proteolytic enzymes and produce coagulation of protein matter to enclose or remove the last trace of carbon.

6. A process for treating extract of yeast, produced by self-peptonisation comprising liquefying the yeast, digesting the liquid, diluting the digested mass, separating by centrifuging, then subjecting the centrifuged extract to centrifugal filtration, concentrating the filtered extract in vacuo to remove some objectionable flavours and to precipitate undesirable solids, heating the extract and treating same with activated carbon to remove bitter and other undesirable flavours, subjecting the extract to ordinary centrifuging to remove the suspended carbon and to filtration in a centrifuge to remove the remaining carbon which is colloidally dispersed, evaporating the filtered extract in vacuo to a thick paste further to precipitate unwanted solids, redissolving the paste in hot water to destroy proteolytic enzymes and produce coagulation of protein matter to enclose or remove the last trace of carbon, centrifuging the extract and then finally evaporating to a thick paste.

7. The process of manufacturing a soluble food extract from brewers' yeast which comprises liquefying the crude yeast at a raised temperature, digesting the liquid for a lengthy period at said temperature, diluting the mass, and centrifuging to remove insoluble matter, further subjecting the extract to centrifugal filtration, concentrating the extract by evaporation, heating same and maintaining said heating for about an hour while a small percentage by volume of activated carbon is gradually added, subjecting the extract to plain or ordinary centrifuging to remove the suspended carbon and then to centrifugal filtration through an adsorptive filter to remove the colloidally dispersed carbon, evaporating the extract in vacuo to a thick paste, redissolving the paste in hot water and heating to a temperature sufficient to destroy proteolytic enzymes and produce coagulation of protein matter to enclose or remove the last trace of carbon and subjecting the heated liquid to centrifuging and evaporating to obtain the final product.

JAMES HILL MILLAR.